US008423502B1

United States Patent
Degany et al.

(10) Patent No.: US 8,423,502 B1
(45) Date of Patent: Apr. 16, 2013

(54) SYSTEM, METHOD, AND COMPUTER PROGRAM PRODUCT FOR PERMITTING AN UPGRADE OF EXTRACT, TRANSFORM, AND LOAD (ETL) PROCESSES, INDEPENDENT OF A CUSTOMIZATION PERFORMED BY A USER

(75) Inventors: Elad Degany, Zur-Moshe (IL); Yossi Levin, Azur (IL)

(73) Assignee: Amdocs Software Systems Limited, Dublin (IE)

( * ) Notice: Subject to any disclaimer, the term of this patent is extended or adjusted under 35 U.S.C. 154(b) by 592 days.

(21) Appl. No.: 12/435,107

(22) Filed: May 4, 2009

(51) Int. Cl.
*G06F 17/00* (2006.01)

(52) U.S. Cl.
USPC .......... 707/602; 707/601; 707/603; 707/604; 707/607; 707/608

(58) Field of Classification Search .......... 707/600–899; 709/203; 718/100
See application file for complete search history.

(56) References Cited

U.S. PATENT DOCUMENTS

| | | | |
|---|---|---|---|
| 2005/0071842 A1* | 3/2005 | Shastry | 718/100 |
| 2005/0131970 A1 | 6/2005 | Salazar et al. | 707/205 |
| 2005/0228728 A1 | 10/2005 | Stromquist | 705/30 |
| 2005/0262192 A1* | 11/2005 | Mamou et al. | 709/203 |
| 2009/0177671 A1* | 7/2009 | Pellegrini et al. | 707/100 |

* cited by examiner

*Primary Examiner* — Isaac M Woo
(74) *Attorney, Agent, or Firm* — Zilka-Kotab, PC

(57) ABSTRACT

A system, method, and computer program product are provided for permitting an upgrade of extract, transform, and load (ETL) processes, independent of a customization performed by a user. In operation, one or more ETL processes are identified. Additionally, a user is permitted to customize the one or more ETL processes. Further, an upgrade of the one or more ETL processes is permitted and enabled.

21 Claims, 5 Drawing Sheets

_SYSTEM, METHOD, AND COMPUTER PROGRAM PRODUCT FOR PERMITTING AN UPGRADE OF EXTRACT, TRANSFORM, AND LOAD (ETL) PROCESSES, INDEPENDENT OF A CUSTOMIZATION PERFORMED BY A USER_

FIELD OF THE INVENTION

The present invention relates to extract, transform, and load processes, and more particularly to customizing such processes, in a way that the entire process can be upgraded automatically.

BACKGROUND

To date, extract, transform, and load (ETL) tools do not support upgrade if customizations were executed on core product processes. Therefore, when using these traditional ETL tools, users must develop another set of separate external ETL processes to support customization and upgrade.

As another option, the core code associated with the ETL tools may be changed. In this case, the core product can not be upgraded. Furthermore, advanced knowledge of the core code is needed.

The typical customization techniques are based on developing new sets of processes to populate the extensions of a database. These techniques typically affect performance because they duplicate the number of processes and entities involved. There is thus a need for addressing these and/or other issues associated with the prior art.

SUMMARY

A system, method, and computer program product are provided for permitting an upgrade of extract, transform, and load (ETL) processes, independent of a customization performed by a user. In operation, one or more ETL processes are identified. Additionally, a user is permitted to customize the one or more ETL processes. Further, an upgrade of the one or more ETL processes is permitted and enabled.

DETAILED DESCRIPTION

Figure 1:
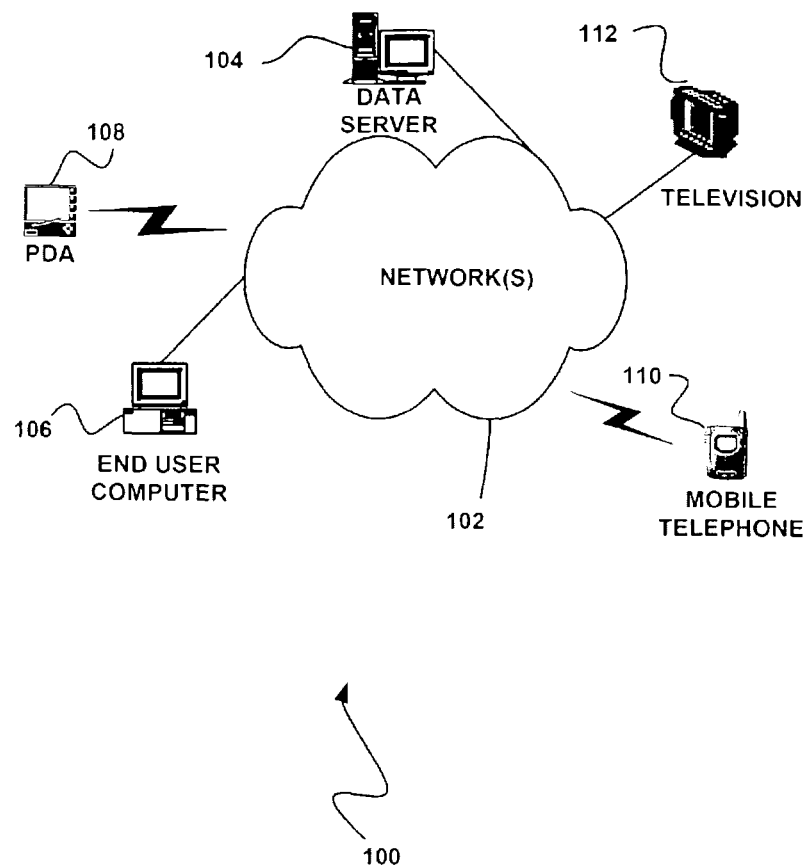
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
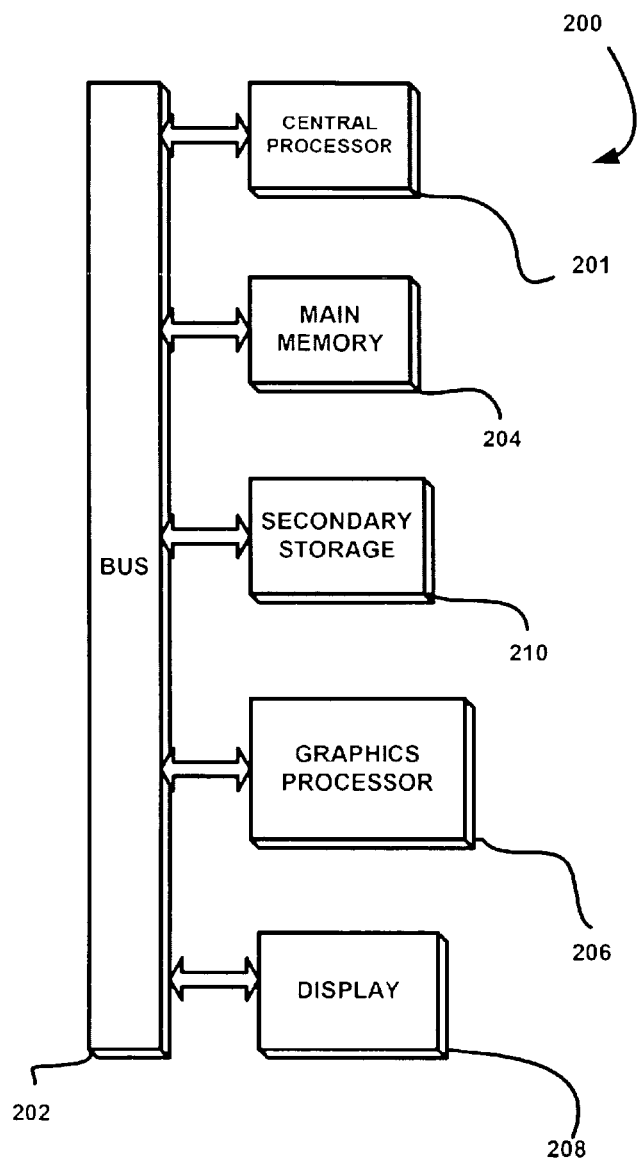
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
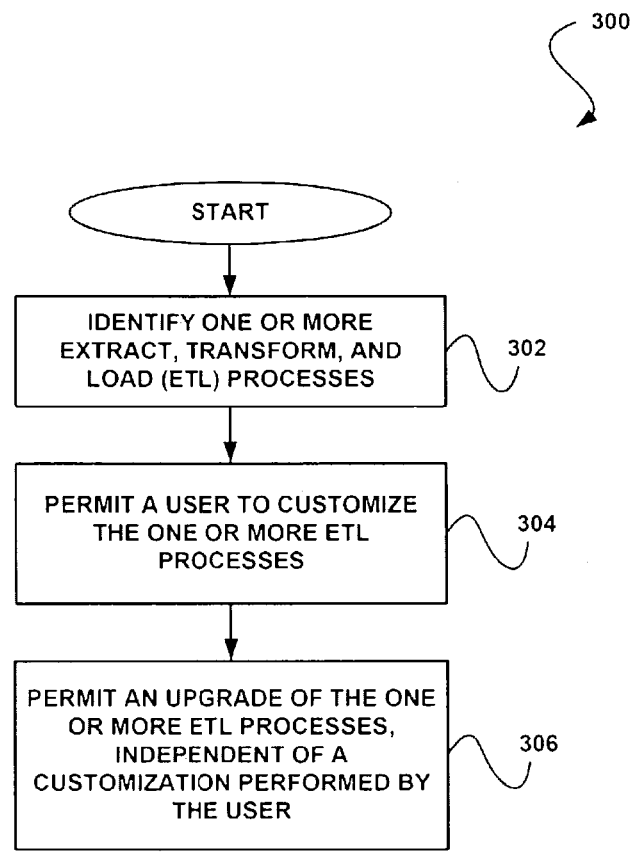
FIG. 3 shows a method for permitting an upgrade of extract, transform, and load (ETL) processes, independent of a customization performed by a user, in accordance with one embodiment.

FIG. 3 shows a method 300 for permitting an upgrade of extract, transform, and load (ETL) processes, independent of a customization performed by a user, in accordance with one embodiment. As an option, the method 300 may be implemented in the context of the details of FIG. 1 and/or 2. Of course, however, the method 300 may be carried out in any desired environment. Further, the aforementioned definitions may equally apply to the description below.

As shown, one or more extract, transform, and load (ETL) processes are identified. See operation 302. In the context of the present description, an ETL process refers to any process of extracting data, transforming the data to fit one or more operational criteria, and loading the data into a target (e.g. a database, etc.).

Additionally, a user is permitted to customize the one or more ETL processes. See operation 304. The user may customize the ETL processes to best fit the operational needs of the user.

In one embodiment, the user may be able to customize any core ETL process. For example, the ETL processes may include core ETL processes. As an option, these core ETL processes may be marked by an indicator.

The indicator may include any indicator for identifying a process as a core process. For example, in one embodiment, the indicator may include a flag or similar indicator.

Additionally, as part of allowing the user to customize the ETL processes, the user may be allowed to customize existing objects associated with the one or more ETL processes. In this case, the existing objects may include one or more core objects. In some cases, the core objects may each be identified by an identifier. For example, the identifier may include a flag.

As an option, all objects may initially be identified as a core object. In this case, the user may be permitted to change the identification of the core object. For example, the user may have the ability to change the core object to a non-core object.

In one embodiment, the user may be permitted to customize the one or more ETL processes by adding new objects to the ETL processes. In this case, the user may be permitted to customize the one or more ETL processes by adding the new objects if the new objects are a similar object structure as an object structure of existing objects.

In another embodiment, the user may be permitted to customize the one or more ETL processes by adding attributes to the existing objects. In still another embodiment, the user may be permitted to customize the one or more ETL processes by adding fields to the existing objects.

In any case, an upgrade of the one or more ETL processes is permitted, independent of a customization performed by the user. See operation 306. In one embodiment, the upgrade may include an automatic upgrade. For example, the automatic upgrade may include an upgrade associated with a subsequent release of the one or more ETL processes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
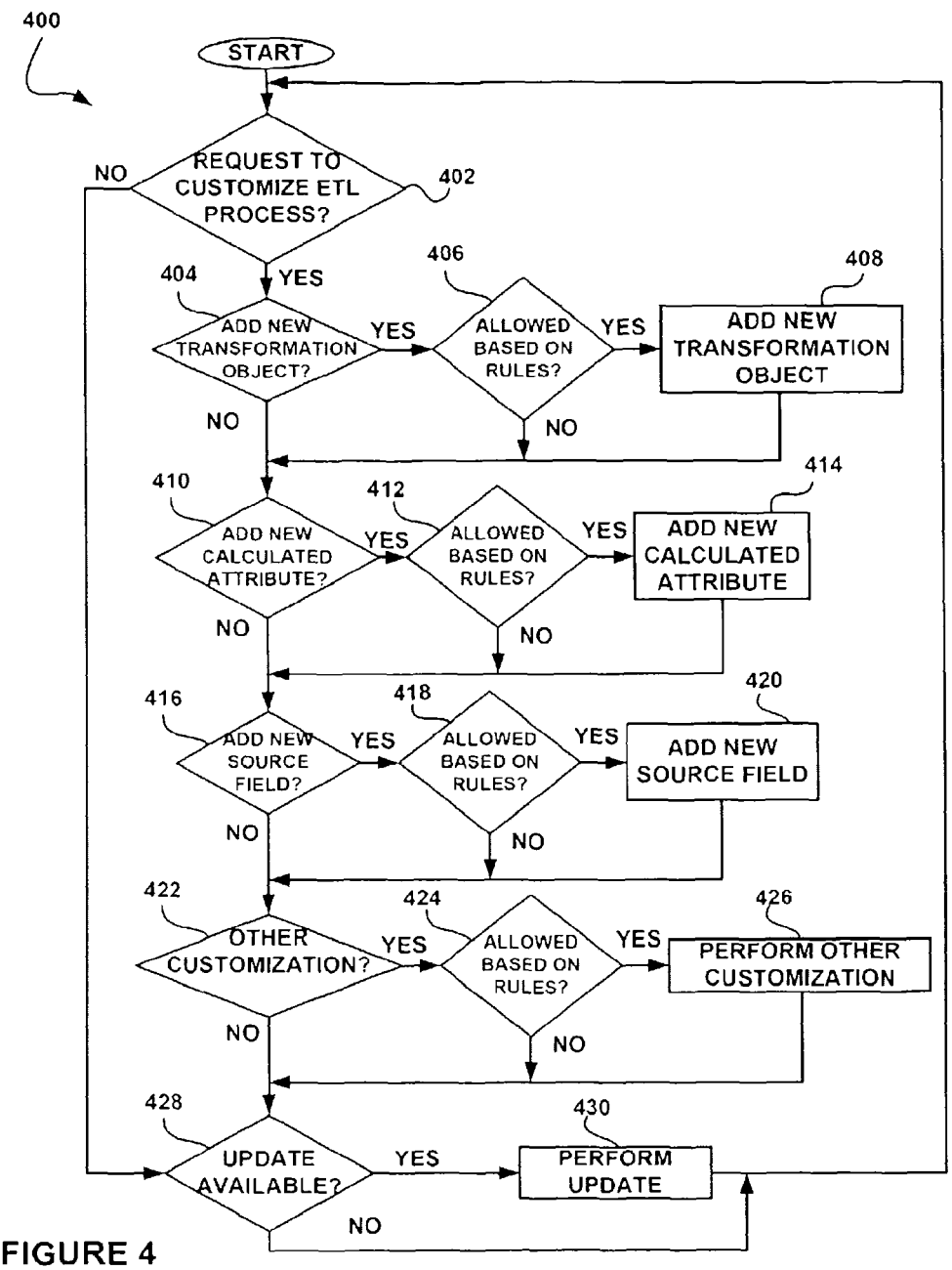
FIG. 4 shows a method for permitting an upgrade of ETL processes, in accordance with one embodiment.

FIG. 4 shows a method 400 for permitting an upgrade of ETL processes, in accordance with one embodiment. As an option, the method 400 may be implemented in the context of the details of FIGS. 1-3. Of course, however, the method 400 may be carried out in any desired environment. Again, the aforementioned definitions may equally apply to the description below.

As shown, it is determined whether a request to customize an ETL process is received. See operation 402. In one embodiment, the request may be received by a user via a user interface. In this case, the user interface may include a graphical user interface for customizing an ETL process.

The ETL processes may include any type of ETL process. For example, in one embodiment, the ETL processes may be associated with one or more business intelligence (BI) projects. In this case, the BI projects may include one or more predefined BI products.

Furthermore, the ETL processes may be capable of extracting data from operational systems. In this case, the extracted data may be extracted to a BI database or other memory system.

If it is determined that a request to customize an ETL process is received, it is determined whether the customization includes adding a new transformation object to the ETL process. See operation 404. In this case, the ETL process may include existing objects and the new objects may be added to the existing objects.

The existing objects may include any objects associated with the ETL process. For example, in various embodiments, the objects may include rows, columns, tables, aggregate objects, and/or any other object associated with an ETL process.

If it is determine that a new transformation object is to be added, it is determined whether the object may be added based on one or more customization rules. See operation 406. The rules may include any number of rules associated with the customization.

For example, in one embodiment, the rules may include only allowing the user to add core objects. In another embodiment, the rules may include only allowing the user to add objects that have a similar structure to existing objects. In yet another embodiment, the rules may include only allowing the user to add a certain number or type of object.

Still yet, the rules may be defined such that the user is not able to add any objects. If it is determined that, based on the rules, the new transformation object may be added, the new object is added to the ETL process. See operation 408.

It is further determined whether the customization includes adding a new calculated attribute to an existing object. See operation 410. The new calculated attribute may include any attribute associated with the existing object.

For example, in various embodiments, the attribute may include an attribute associated with a column, a row, a table, and/or any other object. If it is determined that a new attribute is to be added to an existing object, it is determined whether the attribute may be added based on the one or more rules. See operation 412.

In one embodiment, the rules may prohibit certain attributes from being added. In another embodiment, the rules may prohibit the number of attributes to be added. In still another embodiment, the rules may only allow attributes to be added that have characteristics similar to existing attributes.

Still yet, the rules may be defined such that the user is not able to add any attributes. If it is determined that, based on the rules, the new calculated attribute may be added, the new attribute is added to the existing object. See operation 414.

It is further determined if a new source field is to be added. See operation 416. In this case, the field may include any field associated with the ETL process and/or an existing object. Further, the field may include any alphabetical or number sequence.

If it is determined that a new field is to be added, it is determined whether the source field may be added based on the one or more rules. See operation 418. In this case, the rules may prohibit certain fields from being added, restrict a length of the fields, prohibit duplicate fields from being added, and/or be utilized to mediate any type of field addition.

If it is determined that, based on the rules, the new source field may be added, the new field is added. See operation 420. It is further determined whether any other customization is to occur. See operation 422.

In this case, the other customization may include any customization that is allowed based on the rules. See operation 424. If it is determined that another customization is allowed to be performed, based on the rules, the customization is performed. See operation 426.

As shown further in FIG. 4, it is determined whether an update is available for the ETL processes. See operation 428. If an update is available, the ETL process update is performed. See operation 430.

It should be noted that the update may be performed independent of any customization of the ETL processes by the user. In this way, a customization layer may be utilized that will enable the customers to customize the ETL solution, without having to suffer from a performance penalty, and still be able to upgrade to the next core release without losing the unique customizations of the product.

Figure 5:
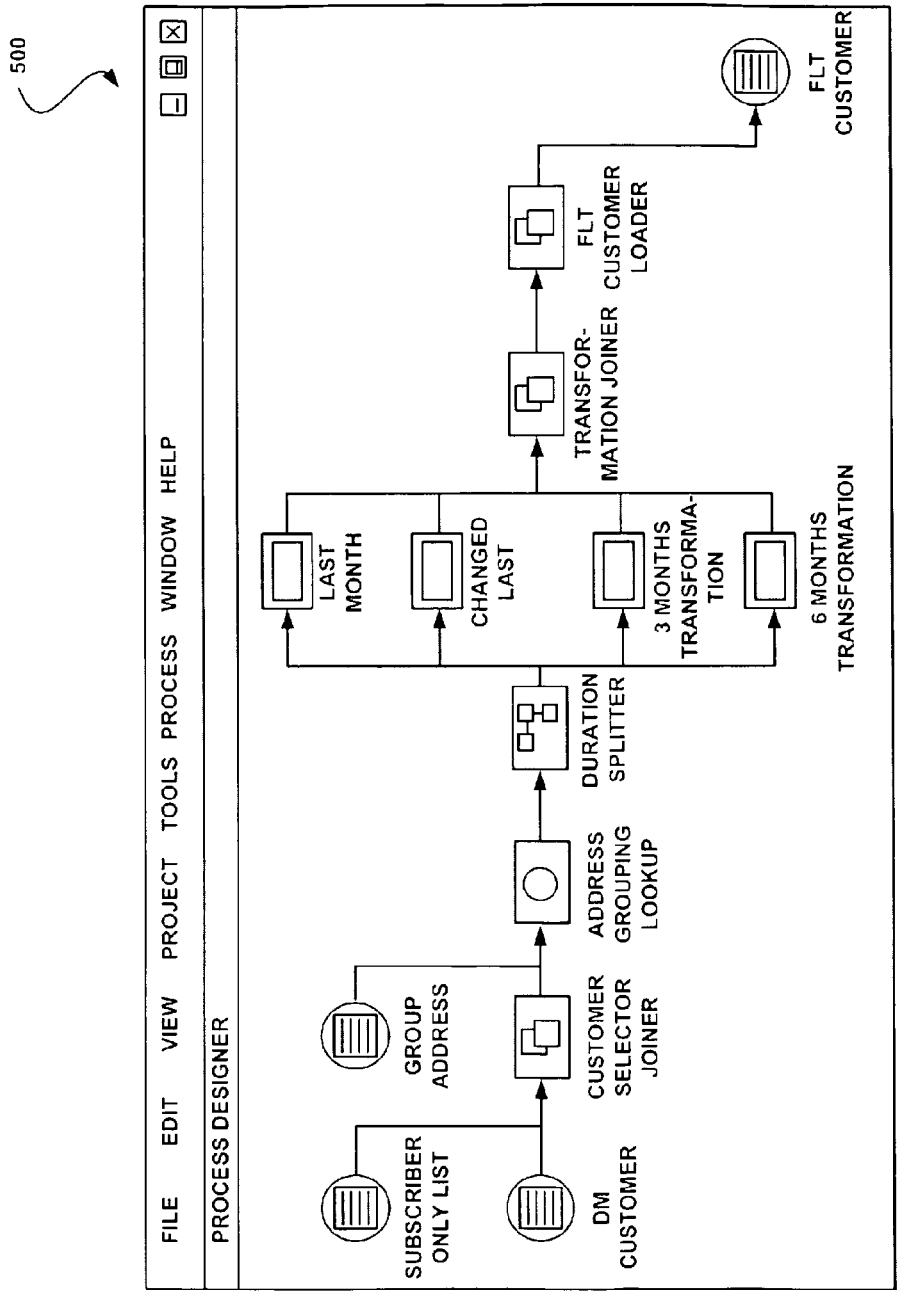
FIG. 5 shows an interface for customizing ETL processes, in accordance with one embodiment.

FIG. 5 shows an interface 500 for customizing ETL processes, in accordance with one embodiment. As an option, the interface 500 may be implemented in the context of the details of FIGS. 1-4. Of course, however, the interface 500 may be carried out in any desired environment. Further, the aforementioned definitions may equally apply to the description below.

As shown, the interface 500 may be utilized to design and customize ETL processes. Using the interface 500, a user may customize one or more ETL processes and associated objects. In one embodiment, such customization may be subject to customization rules.

For example, as an option, a user may have the ability to add new objects, only if similar the new objects are similar in structure to existing objects. As another option, the user may be permitted to add attributes in existing objects. Furthermore, the user may be permitted to add attributes to newly created objects.

In another embodiment, the user may be able to add fields to one or more objects. In this case, the fields may be numeric, alphabetical, or alpha-numeric. The fields may include any field determined by the user.

The user may utilize the interface 500 to customize a source and/or target. In this case, the user may customize an area from which data is extracted. For example, as shown in FIG. 5, the user may specify "DM CUSTOMER" as the source of extraction.

Additionally, the user may specify where the data is to be extracted. For example, as shown in FIG. 5, the user may specify "FLT CUSTOMER" as the destination for the extracted data. In addition to specifying the source and/or target, the user may add new columns to the ETL processes. As an option, this may be implemented such that the target data is placed in these additional columns.

Furthermore, the user may aggregate objects using the interface 500. For example, FIG. 5 depicts various aggregations created by a user. In this case, "Last Month," "Changed Last," "3 Months Transformations," and "6 Months Transformations," may represent various aggregations capable of being modified or created by the user.

Still yet, using the interface 500, the user may add new columns to each of the four aggregations. Furthermore, additional new aggregation objects (e.g. "12M Trans," etc.) may be created using the interface 500. In one embodiment, aggregated attributes may be added inside an existing aggregator (e.g. "Average XXX," etc.).

The interface 500 may be implemented in the context of any ETL process. For example, the customization interface 500 may be utilized for customizing ETL processes used in the context of data integration in a data warehouse (DWH) or BI projects. The BI product may be a pre-defined, out-of-the-box BI and may include many ETL processes for extracting data from the operational systems into a BI data mart.

In general, traditional ETL tools do not support customizations on core product processes. Therefore, when using these traditional ETL tools, the users must develop another set of external ETL processes to support customization and upgradability. Additionally, the core code may be changed, which typically means that the core product can not be upgraded.

The typical customization techniques are based on developing new sets of processes to populate the extensions of the data mart. These techniques typically affect performance since they duplicate the number of entities involved.

Using the interface 500 to customize ETL processes, customers are allowed to customize the core processes, while still being able to upgrade to a next core release using an automatic upgrade mechanism. Additionally, the customized ETL processes improve performance, while still being able to upgrade when desired or required.

Additionally, currently, ETL packages are solutions and not products. This means that if a vendor provides an ETL package to a customer, there is no way to integrate the new release with customizations implemented by the customer, assuming the customer has the source code and perform changes in the core product.

The customization layer presented above will enable the customers to customize the ETL solution, without suffering from a performance penalty. Furthermore, the customer will still be able to upgrade to the next core release without losing the unique customizations.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying one or more extract, transform, and load (ETL) processes, utilizing a processor;
receiving a request from a user to customize the one or more ETL processes;
permitting the user to customize the one or more ETL processes by adding new objects to the one or more ETL processes, the new objects including one or more of rows, columns, and tables;
enforcing one or more rules associated with customizing the one or more ETL processes; and
permitting an automatic upgrade of the one or more ETL processes to one or more upgraded ETL processes released subsequent to the customizing of the one or more ETL processes, independent of a customization performed by the user, where the upgrade of the one or more ETL processes to the one or more upgraded ETL processes is performed without losing the customization of the one or more ETL processes performed by the user;
wherein the rules include allowing the user to add only a certain type of objects to the one or more ETL processes.

2. The method of claim 1, wherein the one or more ETL processes include core ETL processes.

3. The method of claim 1, wherein the ETL processes are associated with one or more business intelligence (BI) projects.

4. The method of claim 3, wherein the BI projects include one or more predefined BI products.

5. The method of claim 1, wherein the one or more ETL processes are capable of extracting data from operational systems.

6. The method of claim 5, wherein the extracted data is extracted to a BI database.

7. The method of claim 1, wherein the upgrade includes an automatic upgrade.

8. The method of claim 1, further comprising allowing the user to customize existing objects associated with the one or more ETL processes.

9. The method of claim 8, wherein the existing objects include one or more core objects.

10. The method of claim 9, wherein the one or more core objects are each identified by an identifier.

11. The method of claim 10, wherein the identifier includes a flag.

12. The method of claim 8, wherein the user is permitted to customize the one or more ETL processes by adding attributes to the existing objects.

13. The method of claim 8, wherein the user is permitted to customize the one or more ETL processes by adding fields to the existing objects.

14. The method of claim 13, wherein the fields include one or more of a numeric field, an alphabetical field, and an alpha-numeric field.

15. The method of claim 1, wherein the user is permitted to customize the one or more ETL processes by adding the new objects if the new objects are a similar object structure as an object structure of the existing objects.

16. The method of claim 1, wherein the rules include allowing the user to add only a certain number of objects to the one or more ETL processes.

17. The method of claim 1, wherein each of the one or more ETL processes include core processes, and the one or more upgraded ETL processes include subsequent core process releases.

18. The method of claim 1, wherein each of the one or more ETL processes are identified as core processes by a flag.

19. A computer program product embodied on a computer readable medium, comprising:
   computer code for identifying one or more extract, transform, and load (ETL) processes;
   computer code for receiving a request from a user to customize the one or more ETL processes;
   computer code for permitting the user to customize the one or more ETL processes by adding new objects to the one or more ETL processes, the new objects including one or more of rows, columns, and tables;
   computer code for enforcing one or more rules associated with customizing the one or more ETL processes; and
   computer code for permitting an automatic upgrade of the one or more ETL processes to one or more upgraded ETL processes released subsequent to the customizing of the one or more ETL processes, independent of a customization performed by the user, where the upgrade of the one or more ETL processes to the one or more upgraded ETL processes is performed without losing the customization of the one or more ETL processes performed by the user;
   wherein the rules include allowing the user to add only a certain type of objects to the one or more ETL processes.

20. An apparatus, comprising:
   a processor for identifying one or more extract, transform, and load (ETL) processes;
   logic for receiving a request from a user to customize the one or more ETL processes;
   an interface for permitting the user to customize the one or more ETL processes by adding new objects to the one or more ETL processes, the new objects including one or more of rows, columns, and tables;
   logic for enforcing one or more rules associated with customizing the one or more ETL processes; and
   logic for permitting an automatic upgrade of the one or more ETL processes to one or more upgraded ETL processes released subsequent to the customizing of the one or more ETL processes, independent of a customization performed by the user, where the upgrade of the one or more ETL processes to the one or more upgraded ETL processes is performed without losing the customization of the one or more ETL processes performed by the user;
   wherein the rules include allowing the user to add only a certain type of objects to the one or more ETL processes.

21. The apparatus of claim 20, wherein the processor remains in communication with memory and via a bus.

* * * * *